United States Patent
Limbacher et al.

(10) Patent No.: US 9,663,099 B2
(45) Date of Patent: May 30, 2017

(54) METHOD FOR OPERATING A MOTOR VEHICLE HAVING A HYBRID DRIVE

(71) Applicant: AUDI AG, Ingolstadt (DE)

(72) Inventors: Reimund Limbacher, Ingolstadt (DE); Oliver Hahne, Lenting (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/769,482

(22) PCT Filed: Feb. 1, 2014

(86) PCT No.: PCT/EP2014/000264
§ 371 (c)(1),
(2) Date: Aug. 21, 2015

(87) PCT Pub. No.: WO2014/127884
PCT Pub. Date: Aug. 28, 2014

(65) Prior Publication Data
US 2015/0375733 A1    Dec. 31, 2015

(30) Foreign Application Priority Data

Feb. 25, 2013 (DE) .................. 10 2013 003 143

(51) Int. Cl.
*B60W 10/08* (2006.01)
*B60W 20/00* (2016.01)
(Continued)

(52) U.S. Cl.
CPC ............ *B60W 20/10* (2013.01); *B60W 10/06* (2013.01); *B60W 10/08* (2013.01); *B60W 10/10* (2013.01);
(Continued)

(58) Field of Classification Search
CPC ............................ B60W 20/10; B60W 20/30
(Continued)

(56) References Cited

U.S. PATENT DOCUMENTS 5,984,034 A * 11/1999 Morisawa ................ B60K 6/48
180/65.28

6,081,042 A * 6/2000 Tabata ................ B60K 6/365
180/65.25
(Continued)

FOREIGN PATENT DOCUMENTS

CN        102666234        9/2012
DE        19712246        11/1997
(Continued)

OTHER PUBLICATIONS

International Search Report issued by the European Patent Office in International Application PCT/EP2014/000264 on Feb. 1, 2014.
Chinese Search Report issued on Dec. 30, 2016 with respect to counterpart Chinese patent application 201480010224.9.
Translation of Chinese Search Report issued on Dec. 30, 2016 with respect to counterpart Chinese patent application 201480010224.9.

*Primary Examiner* — Redhwan k Mawari
*Assistant Examiner* — Anshul Sood
(74) *Attorney, Agent, or Firm* — Henry M. Feiereisen LLC

(57) ABSTRACT

A method for operating a motor vehicle having a hybrid drive is disclosed. The hybrid drive includes an internal combustion engine, an electric machine having an associated energy store, which can be charged when the electric machine is operated as generator, and an electronically shiftable transmission, the gears of which can be manually upshifted or downshifted by operating a selecting element, wherein the electric machine is switched to generator operation when a lower gear is selected by operating the selecting element at least once or another shifting mode of a transmission control unit leading to a higher rotational speed because of a gear change is selected and, after the gear selection or shifting mode selection, the acceleration of the motor vehicle is not changed or changed only to a predetermined extent by pressing the accelerator pedal.

7 Claims, 1 Drawing Sheet

(51) Int. Cl.

| | | |
|---|---|---|
| *B60W 20/10* | (2016.01) | |
| *B60W 50/10* | (2012.01) | |
| *B60W 10/06* | (2006.01) | |
| *B60W 20/30* | (2016.01) | |
| *B60W 10/10* | (2012.01) | |
| *B60W 20/13* | (2016.01) | |
| *B60W 30/188* | (2012.01) | |
| *B60W 30/19* | (2012.01) | |

(52) U.S. Cl.
CPC ............ *B60W 20/13* (2016.01); *B60W 20/30* (2013.01); *B60W 50/10* (2013.01); *B60W 30/1882* (2013.01); *B60W 30/19* (2013.01); *B60W 2540/10* (2013.01); *B60W 2540/16* (2013.01); *B60W 2710/06* (2013.01); *B60W 2710/08* (2013.01); *B60W 2710/083* (2013.01); *B60W 2710/1038* (2013.01); *B60Y 2400/71* (2013.01); *Y02T 10/6286* (2013.01); *Y10S 903/93* (2013.01)

(58) Field of Classification Search
USPC .......................................................... 701/22
See application file for complete search history.

(56) References Cited

U.S. PATENT DOCUMENTS

| | | | |
|---|---|---|---|
| 8,489,281 | B2 | 7/2013 | Reichel et al. |
| 9,400,050 | B2* | 7/2016 | Baumer .............. F16H 59/0204 |
| 2008/0221760 | A1* | 9/2008 | Wakamatsu ............ F16H 61/18 |
| | | | 701/52 |
| 2010/0292899 | A1* | 11/2010 | Kitaori ................ F16H 61/0213 |
| | | | 701/52 |
| 2013/0138287 | A1 | 5/2013 | Brenneke |

FOREIGN PATENT DOCUMENTS

| | | |
|---|---|---|
| DE | 19718709 | 11/1997 |
| DE | 102007035424 | 1/2009 |
| DE | 102009001296 | 9/2010 |
| DE | 202010010691 | 11/2010 |
| DE | 102009026788 | 12/2010 |
| DE | 102010034003 | 2/2012 |
| EP | 2546496 | 1/2013 |

* cited by examiner

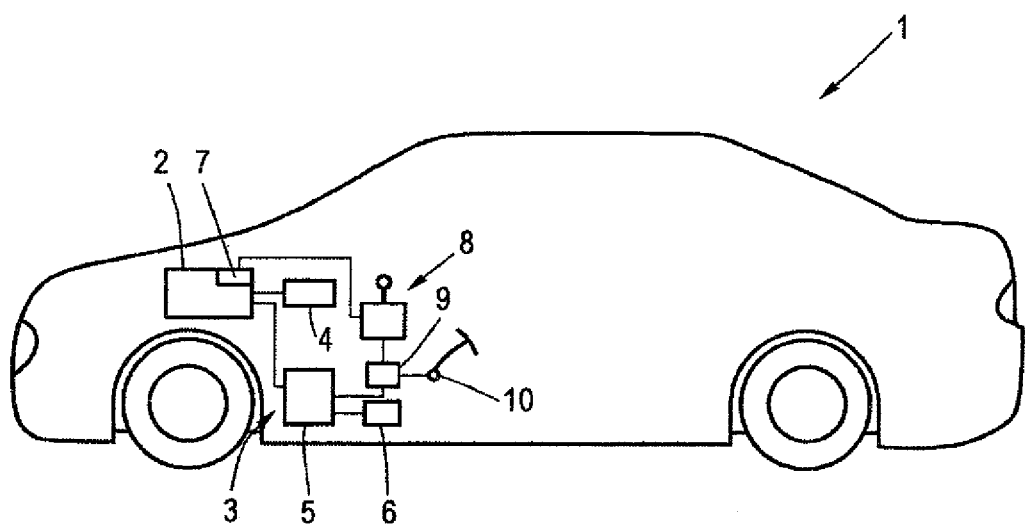

METHOD FOR OPERATING A MOTOR VEHICLE HAVING A HYBRID DRIVE

CROSS-REFERENCES TO RELATED APPLICATIONS

This application is the U.S. National Stage of International Application No. PCT/EP2014/000264, filed Feb. 1, 2014, which designated the United States and has been published as International Publication No. WO 2014/127884 and which claims the priority of German Patent Application, Serial No. 10 2013 003 143.5, filed Feb. 25, 2013, pursuant to 35 U.S.C. 119(a)-(d).

BACKGROUND OF THE INVENTION

Method for operating a motor vehicle with hybrid drive including an internal combustion engine and an electric machine with associated energy storage, which is chargeable when the electric machine is operated as generator, and an electronically shiftable transmission whose gears are manually shiftable up and down by actuating a selector element.

Motor vehicles with hybrid drive become increasingly popular. Especially so-called full hybrid vehicles whose energy storage, i.e., whose battery is exclusively charged via the electric machine that is operated as generator, and so-called plug-in hybrid vehicles, which in addition offer the possibility to charge the energy storage via a conventional electric outlet connection. Both have in common that they are configured so that on one hand a hybrid operating mode and a purely electric operating mode exist. In the hybrid mode the internal combustion engine is predominantly active, while the electric machine, which is then operated as electric motor, can have a supportive drive function, and can for example contribute an additional acceleration (boosting) or serve for lowering the load point. As an alternative the electric machine can be operated as generator in the hybrid mode and can either recuperate, i.e., charge the energy storage (traction battery), or it can increase the load point of the internal combustion engine. While the traction battery can thus be recharged when driving in the generator mode, the traction battery is predominantly discharged in the purely electric operating mode.

Especially in plug-in-hybrid-vehicles that have a relatively large energy storage, the purely electric operating mode is mostly selected as default state after entering and activating the vehicle, i.e., after starting the drive the vehicle is driven predominantly electrically until the energy storage is empty. In order to offer the option to the driver to quickly charge the energy storage via the internal combustion engine during the drive, a charge mode can be selected as special form of the hybrid operating mode. In this charge mode, in which the electric machine is then operated as generator, the internal combustion engine participates in driving the electric machine in all weak and partial load phases; a certain increase of the load point occurs. The charge mode is selected by the driver, i.e., either by actuating a separate operating button, which is only provided for this purpose, or by selecting a menu item in an input menu on a display.

This type of selecting the charge mode, however, requires the installation and actuation of an additional button in the vehicle, which leads to increased costs and may be uncomfortable for the driver. Also the selection of an additional menu item in an input menu that has to be configured is cumbersome, and may render the input menu overly complex or hard to comprehend.

SUMMARY OF THE INVENTION

The invention is based on the object to provide a method, which enables a simplified change to the charge mode.

For solving this problem in a method of the aforementioned type it is provided according to the invention that the electric machine is switched to operate in the generator mode when a lower gear is selected by an at least one-time actuation of the selector element or a different shifting mode of a transmission control device is selected in response to a gear change that leads to a higher rotational speed and after the gear change or shifting mode selection the acceleration of the motor vehicle is not changed by actuating the accelerator pedal or is only changed to an predetermined degree.

The invention is based on the idea to couple the change into the charge mode to an already present function or a present operating process. For a change two boundary conditions have to be satisfied. On one hand a gear change to a lower gear has to be selected by actuating the selector element which acts on the transmission control device, i.e., the gear selector lever, which as "Tiptronic" function can also shift individual gears manually; as an alternative the gear change can also be selected by actuating a gearshift paddle on the steering wheel. In any case this leads to an increase of the rotational speed. This increase of the rotational speed can also be achieved by changing from the drive position D to the drive position S, this also increases the rotational speed. Because most drivers know that a discharged 12 volt battery of a vehicle can be recharged faster by increasing the engine speed, which the driver for example intentionally does by pushing down the accelerator pedal while in driving in the neutral driving position or by driving in a lower gear, it can be assumed that an increased engine speed, and with this also an active shift into a lower gear, generally represents an operating function that can easily be associated with the expectation to charge a traction battery and with this can be intuitively understood by the driver. The other boundary condition is that the shift into a lower gear or the change of the shifting mode is not immediately followed by a power demand, i.e., the driver does not, or not excessively, accelerate immediately after the gear shift or the change of the shifting mode. The second boundary condition is thus that the driver does not actuate the accelerator pedal or only actuates the accelerator pedal to a predetermined degree, i.e., he does not or only slightly accelerate the vehicle and consequently no high power is requested that could not be delivered at the desired level by switching the electric machine to the generator mode with the resulting load point increase.

When the driver thus manually shifts one gear lower via the selector element and the given acceleration is subsequently is maintained, this is interpreted as a desire to charge the battery or respectively this satisfies two boundary conditions which enable a switching into the charge mode. This desired battery charge can now be realized by driving in the weak or partial load range by switching the electric machine into the generator mode associated with a small increase of the load point, which in this case, however, is not disadvantageous because no increased power has to be provided.

This change to the generator mode, however, does not occur when the driver strongly accelerates immediately after shifting into a lower gear or immediately after the change of the shifting mode, because in this case it is clear that the shifting into a lower gear only has the purpose to change the rotational speed range and to shift the load range.

A corresponding switching also occurs when the driver shifts into a lower gear while in the trailing throttle mode, i.e., when the driver does not actuate the accelerator pedal, shifts into a lower gear or changes the shifting mode. When the generator mode is now activated the increased drag-torque also results in the recuperation power, which as expected also increases the battery charge.

The change into the generator mode is in any case immediately reversed when the driver accelerates, i.e., actuates the accelerator pedal. The increase of the load point, resulting from the switch into the generator mode is interrupted, in order to enable the maximal acceleration as desired. The electric machine is consequently switched into the engine mode or is at least decoupled so that that it no longer causes an increase of the load point.

For switching the electric machine into the generator mode, it is also conceivable to actuate the selector element twice in short succession, wherein a shifting down by a further gear is initially suppressed. In order to increase the load point, i.e., to switch the electric machine to operate as generator, the request to shift down has to be given twice in short succession via the selector lever in the "Tiptronic"-mode, alternatively via the corresponding paddle. On one hand the gear is shifted down via the first actuation, the second actuation servers for signaling that a battery charge is desired, then a shifting down by a further gear is omitted. However, when the accelerator pedal is actuated immediately after the two-time actuation, or as the case may be parallel to two-time actuation, this indicates that no charge is desired, rather in this case a downward gear shift by two gears is performed. This thus allows differentiating between whether a charge request is given by two-time actuation of the selector element or whether a full acceleration is desired.

When a two-time actuation is performed without actuating the accelerator pedal, the load point of the electric machine, which is operated as generator, can also be increased for a faster charging.

When the gear change is performed by actuating a shifting paddle on the steering wheel, the transmission control device usually switches from an automatic shifting mode into a manual shifting mode in which the gears can only be shifted via the shifting paddles so long as the transmission control device is in this mode. The transmission control device automatically leaves this state again, however, when the shifting paddle is not actuated again for a defined period of time, for example 5-10 s. According to the invention, when the electric machine was switched into the generator mode as a result of actuating the shifting paddle, this charge mode can also be maintained only for this predetermined period of time, during which the transmission control device is in the manual shifting mode. At the expiration of this predetermined time period the electric machine is switched into the engine mode again or respectively decoupled again. This means that the energy storage is only charge incrementally. When the driver intends to charge the battery to a higher degree he has to actuate the shifting peddle multiple times, until the desired charge state is reached.

It is conceivable in this context that when the selector element has to be actuated twice to effect shifting, in order to cause the electric machine to assume the generator mode, a longer predetermined time period is set than in the case of a single-actuation of the selector element which is Only sufficient to shift into a lower gear. This means that instead of the only 5-10 s lasting charge time, a longer time period is selected in such a case, during which the charge state is maintained.

The predetermined time period should generally be at least 20 s, preferably at least 30 s, in particular at least 60 s. As an alternative no time limit may be given in the manual shifting mode, i.e., charging is performed so long as the vehicle drives in the manual shifting mode and no active change into the automatic shifting mode occurs again by actuating a selector element or the like. Thus so long as the shifted down gear is engaged and is used for driving, the charge mode can also be permanently maintained.

As explained above, it is possible to request charging by two-time actuation of the selector element, i.e., the selector lever or the shifting paddle, with a resulting downshift by only one gear stage. In order to nevertheless enable the driver to shift down by a further gear stage and to still further increase the rotational speed, he can actuate the selector element, or in particular the shifting paddle, a third time. This third actuation then leads to a shifting down by the second gear.

Beside the method the invention also relates to a motor vehicle with hybrid drive including an internal combustion engine and an electric machine with assigned energy storage, which can be charged when the electric machine is operated as generator, and an electronically shiftable transmission, whose gears can be manually shifted up or down by actuating a selector element. This vehicle is characterized in that a control device, which switches the function of the electric machine, is provided and which is configured to implement the method described above. The control device of course communicates with other control devices via an appropriate data bus, in order to obtain the information regarding gear- and mode selection, i.e., actuation of the selector element, and regarding actuation of the accelerator pedal or an acceleration request etc., which are required to determine whether the boundary conditions for switching the operating mode of the electric machine, i.e. switching into the generator mode or into the engine mode, are satisfied or not.

Further advantages, features and details oft the invention will become apparent from the exemplary embodiment described below.

BRIEF DESCRIPTION OF THE DRAWING

The Figure shows a motor vehicle 1 according to the invention, with a transmission 2, which in a not further shown manner is connected with the driven axles. The motor vehicle 1 also has a hybrid drive 3, including an internal combustion engine 4, via which the transmission 2 can be driven, and an electric machine 5, which can be operated as electric motor and also acts on the transmission 2. The electric machine 5 is assigned an energy storage 6, usually in the form of a traction battery, which when the electric machine 5 is operated as generator can be charged via the electric machine 5.

The transmission 2 has a transmission control device 7, which electrically shifts the transmission 2 or respectively also itself receives corresponding control commands from a selector element 8 via which eventually the functional mode or shifting mode of the transmission control device 8 can be controlled.

Further provided is a control device 9, which serves for switching the electric machine 5, i.e., it defines whether to operate the electric machine 5 as generator for charging the energy storage 6 or as electric motor for driving.

DETAILED DESCRIPTION OF PREFERRED EMBODIMENTS

In order to detect in a simple manner whether it is generally possible to operate the electric machine as generator or whether charging of the battery has been requested, the selector element 8, which may for example be the gear stage selector lever, which in the "Tiptronic" mode can also be actuated to shift individual gears or which can also be a shifting paddle on the steering wheel for shifting up or down, communicates with the control device 9. The control device 9 thus detects whether a corresponding request for a shifting into a lower gear has been given. Such a shifting into a lower gear can be a first boundary condition, based on which the electric machine 5 is switched to operate as generator. As an alternative to the individual gear change also a gear change from the drive position D to the drive position S can be selected when the selector element 8 is a selector lever. Like in an single gear change, changing the gear stage in this form leads to an increase of the rotational speed. This means that the first boundary condition, depending on which the electric machine can be switched, is an increase of the rotational speed, which is actively initiated by the driver by actuating the selector element 8, i.e., a selector lever actuated in the "−" direction in the "Tiptronic" mode, or a shifting paddle actuated in the "−" direction in the "Tiptronic" mode.

The second boundary condition is that immediately after such a manually and actively initiated gear change or shifting mode change no acceleration of the vehicle is performed, i.e., an accelerator pedal 10 is not actuated or is actuated at most to a degree which would not indicate an excessive acceleration request. When the accelerator pedal 10 for example remains in its position despite a prior shifting down, this is interpreted as a charge request, the control device 9 then immediately switches the electric machine to operate in the generator mode, which even though resulting in a slight increase of the load point, has no adverse effects, because it can be assumed that a charge request exists and consequently the energy storage 6 is to be charged via the electric machine 5.

This charging process or this charge mode is maintained so long as the driver for example accelerates again, i.e., actuates the accelerator pedal 10, because then a request for power is present, the electric machine is either decoupled or switched to operate as electric motor again so that the load point increase is no longer present and the desired acceleration is available.

When the change into the manual shifting mode by the transmission control device 7 is only temporary, which is usually the case when the gears are shifted down by one gear by means of a steering wheel shifting paddle, a shifting into the automatic shifting mode occurs again after the expiration of a predetermined time period, for example 10 seconds. When the electric machine 5 was switched to the generator mode beforehand, it is now "switched back" or decoupled, the load point increase is reduced again.

On the other hand, when the selector element 8 is the gear stage selector lever, which was moved sideways into the manual "Tiptronic" slot, the change into the manual shifting mode (M-driving mode) is not limited temporally. This means that the charge mode, i.e., the generator mode of the electric machine 5, remains active so long as the selector lever is in the M-position. The same may also apply when the driver changes from the drive position D into the drive position S, without changing into the drive position S, i.e., the "Tiptronic" shifting slot. Also this drive position S can remain engaged permanently, an automatic change into the drive position D does not occur. Thus when the driver leaves the selector lever 8 in the drive position S, the charge mode can be maintained for a longer period of time, at least so long as the accelerator pedal is not actuated and a corresponding power is requested or until a change into the drive position D occurs again. In the meantime the load point increase can be permanently maintained or initiated in the weak or partial load phases due to the shifting of the electric machine into the generator mode.

What is claimed is:

1. A method for operating a motor vehicle with hybrid drive said hybrid drive comprising an internal combustion engine and an electric machine with associated energy storage, which is chargeable in a charging mode when the electric machine is operated as a generator, and an electronically shiftable transmission whose gears are manually shiftable up and down by actuating a selector element, said method comprising:

actuating the selector element at least once, thereby selecting a smaller gear or a different shifting mode of a transmission control device which leads to a higher rotational speed;

switching the electric machine into the charging mode when after the selecting of the smaller gear or the different shifting mode an acceleration of the motor vehicle is not changed or is only changed to a predetermined degree by actuating the accelerator pedal;

causing a transmission control device, which effects a shifting of the gears, to change from an automatic shifting mode to a manual shifting mode in response to the actuating of the selector element;

maintaining the manual shifting mode for a predetermined period time, said predetermined period of time being at least 20 s; and in the absence of a further actuation of the selector element within the predetermined period of time causing the transmission control device to change back into the automatic shifting mode and switching the electric machine into an engine mode after expiration of the predetermined time, wherein a selector lever is actuated twice in short succession for switching the electric machine into the charging mode, wherein the actuating twice of the selector lever suppresses a shifting down by a further gear.

2. The method of claim 1, further comprising after switching the electric machine into the charging mode, switching the electric machine into the engine mode when the acceleration of the motor vehicle is changed or is changed to a degree exceeding the predetermined degree by actuating the accelerator pedal.

3. The method of claim 1, further comprising increasing a load point of the internal combustion engine by correspondingly controlling the electric machine when the electric machine is in the charging mode, to thereby accelerate charging of the energy storage.

4. The method of claim 1, wherein in response to actuating the selector element twice for switching the electric machine, a longer predetermined period of time is set than when actuating the selector element at least once, wherein the actuating the selector element once is only sufficient for the shifting into the smaller gear.

5. The method of claim 1, wherein the predetermined period of time is at least 30 s.

6. The method of claim 1, wherein the predetermined period of time is at least 60 s.

7. A motor vehicle with hybrid drive, comprising:
an internal combustion engine;
an electric machine;
an energy storage chargeable by the electric machine in a charging mode when the electric machine is operated as a generator;
an electronically shiftable transmission, whose gears can be shifted up and down by actuating a selector element; and
a control device which switches the electric machine between an engine mode and a generator mode, said control device being configured to switch the electric machine into the charging mode when in response to an actuation of the selector element at least once a smaller gear is selected or a different shifting mode of a transmission control device is selected which leads to a higher rotational speed, and after selection of the smaller gear or the different shifting mode an acceleration of the motor vehicle is not changed or is only changed to a predetermined degree by actuating the accelerator pedal, said transmission control device effecting a shifting of the gear to change from an automatic shifting mode to a manual shifting mode in response to the actuating of the selector element and maintaining the manual shifting mode for a predetermined period time, said predetermined period of time being at least 20 s and in the absence of a further actuation of the selector element within the predetermined period of time causing the transmission control device to change back into the automatic shifting mode and switching the electric machine into an engine mode after expiration of the predetermined time, wherein a selector lever is actuated twice in short succession for switching the electric machine into the charging mode, wherein the actuating twice of the selector lever suppresses a shifting down by a further gear.

* * * * *